United States Patent
Sunku et al.

(10) Patent No.: US 11,722,729 B2
(45) Date of Patent: Aug. 8, 2023

(54) METHOD AND SYSTEM FOR USE OF EARLIER AND/OR LATER SINGLE-MATCH AS BASIS TO DISAMBIGUATE CHANNEL MULTI-MATCH WITH NON-MATCHING PROGRAMS

(71) Applicant: Roku, Inc., San Jose, CA (US)

(72) Inventors: Raghavendra Sunku, Novato, CA (US); Jaehyung Lee, Seoul (KR); Virginie Debelair, San Francisco, CA (US); Peter Dunker, Thuringia (DE)

(73) Assignee: ROKU, INC., San Jose, CA (US)

( * ) Notice: Subject to any disclaimer, the term of this patent is extended or adjusted under 35 U.S.C. 154(b) by 201 days.

(21) Appl. No.: 16/586,552

(22) Filed: Sep. 27, 2019

(65) Prior Publication Data

US 2021/0021893 A1   Jan. 21, 2021

Related U.S. Application Data

(60) Provisional application No. 62/876,363, filed on Jul. 19, 2019.

(51) Int. Cl.
*H04N 21/442* (2011.01)
*H04N 21/44* (2011.01)
*H04N 21/438* (2011.01)
*H04N 21/4402* (2011.01)
*H04N 21/81* (2011.01)

(52) U.S. Cl.
CPC ....... *H04N 21/442* (2013.01); *H04N 21/4383* (2013.01); *H04N 21/4402* (2013.01); *H04N 21/44016* (2013.01); *H04N 21/812* (2013.01)

(58) Field of Classification Search
CPC ............. H04N 21/442; H04N 21/4383; H04N 21/44016; H04N 21/4402; H04N 21/812
USPC ........................................................... 725/14
See application file for complete search history.

(56) References Cited

U.S. PATENT DOCUMENTS

| 8,081,938 | B2 | 12/2011 | Ishida |
| 8,689,252 | B1 | 4/2014 | Rowe |
| 9,924,222 | B2 | 3/2018 | Seo et al. |
| 2013/0205330 | A1* | 8/2013 | Sinha ............... H04N 21/44008 725/28 |

(Continued)

OTHER PUBLICATIONS

International Search Report and Written Opinion from International Application No. PCT/US2020/042743, dated Oct. 30, 2020.

*Primary Examiner* — Alfonso Castro
(74) *Attorney, Agent, or Firm* — Sterne, Kessler, Goldstein & Fox P.L.L.C.

(57) ABSTRACT

A computing system detects a channel multi-match with non-matching programs, based on fingerprint-based ACR analysis of digital fingerprint data representing a channel rendered by a content presentation device. The system then responsively performs disambiguation based at least in part on detecting an earlier single-channel match and/or a later single-channel match, the disambiguation establishing that the channel rendered by the content presentation device is the single known channel. And based on the disambiguation, the system then uses the single known channel as a basis for carrying out of at least one channel-specific operation, such as recording audience-measurement data and/or invoking dynamic content modification.

20 Claims, 5 Drawing Sheets

(56) References Cited

U.S. PATENT DOCUMENTS

| | | | |
|---|---|---|---|
| 2014/0282671 A1* | 9/2014 | McMillan | H04N 21/44213 |
| | | | 725/19 |
| 2016/0094877 A1* | 3/2016 | Heffernan | H04N 21/44008 |
| | | | 725/19 |
| 2016/0316262 A1* | 10/2016 | Chen | H04N 21/2668 |
| 2016/0316526 A1 | 10/2016 | Chen | |
| 2017/0155964 A1 | 6/2017 | Oztaskent et al. | |
| 2017/0251249 A1* | 8/2017 | Seo | G06K 9/00758 |
| 2017/0264930 A1* | 9/2017 | Mitra | H04N 21/812 |
| 2019/0182542 A1 | 6/2019 | Lee et al. | |

* cited by examiner

US 11,722,729 B2

METHOD AND SYSTEM FOR USE OF EARLIER AND/OR LATER SINGLE-MATCH AS BASIS TO DISAMBIGUATE CHANNEL MULTI-MATCH WITH NON-MATCHING PROGRAMS

REFERENCE TO RELATED APPLICATION

This application claims priority to U.S. Provisional Application No. 62/876,363, filed Jul. 19, 2019, the entirety of which is hereby incorporated by reference.

BACKGROUND

A typical content presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a content presentation device may be in communication with a receiver, such as a local set top box or other similar device or a remote server, that has access to numerous discrete channels of media content and that can selectively deliver a given such channel's media content to the content presentation device for playout.

By way of example, a television may be communicatively linked by a High-Definition Multimedia Interface (HDMI) cable or other interface with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a content presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a content presentation device receives and renders media content, the content presentation device may not have an indication of which channel of media content the content presentation device is rendering. A receiver or other device that selectively tunes to the channel and receives the media content and that provides the media content to the content presentation device may have such information, but the content presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel of content rendered (e.g., being rendered, having been rendered, or in queue to be rendered) by a content presentation device. Further, it may be useful to do so without receiving from a channel-selection device (e.g., receiver or remote control) a report of the channel, and perhaps without any involvement of the channel-selection device. For instance, it may be useful for the content presentation device itself, and/or a network server working in cooperation with the content presentation device, to determine the channel based on an evaluation of the media content rendered by the media presentation.

Given knowledge of the channel of content rendered by the content presentation device, the content presentation device, the network server, and/or another entity could then carry out one or more operations keyed to that channel, such as recording audience-measurement data (e.g., viewership or listenership data, for use in channel ratings) or engaging in dynamic content revision (e.g., selectively replacing a predetermined portion of the media content with alternative content such as a replacement advertisement, or superimposing supplemental content over the media content being rendered), among other possibilities.

One method to determine the channel of content rendered by the content presentation device is to apply fingerprint-based automatic content recognition (ACR) based on digital fingerprint data representing the media content.

With fingerprint-based ACR, a computing system could be provisioned with reference data that includes digital reference fingerprints respectively representing each of various known channels of media content and that maps the reference fingerprints to the respective channels that they represent. Further, as the content presentation device is rendering a channel of media content, the content presentation device could generate and provide the computing system with digital query fingerprints that represent the media content currently being rendered by the content presentation device. The computing system could then compare that query fingerprint data with the reference fingerprint data known to represent media content on various channels. And upon finding that the query fingerprint data matches the reference fingerprint data mapped to a particular channel, the computing system could thus determine that the channel being rendered by the content presentation device is that particular channel.

In practice, the computing system could record and report this determined channel for use as audience-measurement data or for other purposes. For instance, the computing system could generate and provide an ACR data record in which the computing system specifies an identity of the content presentation device, an identity of the determined channel, and a timestamp indicating when the content presentation device was rendering the determined channel, among other possibilities. And this ACR data record could then be used as a basis to inform advertising decisions or for other purposes.

Further, the computing system could use the determined channel as a basis to facilitate dynamic content revision such as dynamic ad insertion (DAI). For instance, once the computing system has determined the channel being rendered by the content presentation device, the computing system could analyze that determined channel of content as the channel is en route to the content presentation device and could detect the presence of a replaceable advertisement on the channel. In response, the computing system could then dynamically cause the content presentation device to replace that upcoming advertisement with a replacement advertisement, such as one targeted based on user demographics or the like.

Unfortunately, however, a problem that can arise in this process is that the same media content may be provided on multiple different channels at a given time, and so digital fingerprint data representing media content being rendered by the content presentation device may not correlate with just the channel being rendered by the content presentation device.

For example, a sports game or political event might be broadcast concurrently on multiple different channels, or a syndicated television or radio show might be broadcast concurrently on multiple different channels. In these or other scenarios, if the content presentation device is presenting such media content and generates and provides query fingerprint data representing the media content, the computing system could map that query fingerprint data to multiple instances of reference fingerprint data corresponding with multiple channels, and consequently the channel identification would be inconclusive.

As a specific example of this, consider a scenario where two different video content providers both broadcast the same sports game, each on a separate respective channel, and where an advertiser has a contract with just one of the content providers to present a targeted replacement advertisement on that provider's broadcast of the game. In this scenario, when a content presentation device is receiving and presenting one of these broadcasts, if the content presentation device generates and provides to the computing system query fingerprint data representing that broadcast, the computing system may find that the query fingerprint data matches reference fingerprint data respectively of both content providers' broadcasts of the game and thus both channels. As a result, it may be unclear whether the content presentation device should present the replacement advertisement or not.

As another example, if the computing system is going to provide an ACR data record for use as audience-measurement data or other purposes, the channel-identification in the ACR data record itself may be inconclusive. Rather than specifying in the ACR data record just a single matching channel, the computing system may construct the ACR data record as a multi-match log that lists the multiple matching channels, i.e., the multiple channels whose reference fingerprint data the computing system determined all matched the query fingerprint data provided by the content presentation device. Yet such a multi-match log may be of relatively little value for audience-measurement purposes or the like, as it would not conclusively specify which of the multiple channels the content presentation device was rendering at the time.

Disclosed herein are methods and systems to help disambiguate channel identification in a scenario where query fingerprint data of a channel rendered by a content presentation device matches multiple instances of reference fingerprint data corresponding respectively with multiple different known channels.

The disclosure provides an integrated, multi-step process that could be carried out by a computing system in real-time or through post-processing. For instance, the computing system could carry out the process in real-time while a content presentation device is rendering a channel of content, to identify the channel so as to facilitate dynamic content revision or other channel-specific operations. Alternatively, the process could be carried out after the fact, through post-processing of one or more multi-match logs as discussed above, among other possibilities.

In accordance with the disclosure, the computing system will detect a channel multi-match scenario based on a determination that query fingerprint data of a channel rendered by the content presentation device matches reference fingerprint data respectively of multiple channels. Given such a channel multi-match, the computing system will further determine based on electronic-program-guide (EPG) information or the like that, at the time of the channel multi-match, at least two of the determined matching channels were scheduled to be presenting different program content than each other. Thus, the computing system will have detected a channel multi-match with non-matching programs.

Practically speaking, this channel multi-match with non-matching programs could occur in various scenarios.

By way of example, at a given time, multiple different channels that are scheduled to be presenting different programs than each other could each be in the midst of a commercial break and could be presenting the same advertisement as each other. In that scenario, the query fingerprint data representing the advertisement being rendered by the content presentation device could match the reference fingerprint data also representing the advertisement respectively on each of those channels, but the programs scheduled on the channels at the time of that channel multi-match would be different than each other.

As another example, at a given time, multiple different channels could be presenting the same live program as each other, and that live program could overrun its scheduled time slot, into a next time slot in which the channels are scheduled to be presenting different programs than each other. As a result, during the overrun, the query fingerprint data representing the overrunning live program being rendered by the content presentation device could match the reference fingerprint data also representing the overrunning live program respectively on each of those channels, but the programs scheduled on the channels at that time would be different than each other.

According to the disclosure, in response to the computing system detecting at least the channel multi-match with non-matching programs, the computing system will then automatically resolve the channel multi-match by taking into account an earlier single-match and/or a later single-match.

In one implementation, for instance, the computing system could evaluate one or more ACR data records for the content presentation device leading up to the time of the channel multi-match and could determine that there was a single matching channel up until the time of the multi-match. Or the computing system could evaluate one or more ACR data records for the content presentation device following the time of the channel multi-match and could determine that there was a single matching channel starting after the multi-match. Based on either of these determinations, the computing system could thus conclude that the single matching channel is the channel rendered by the content presentation device at the time of the detected multi-match.

Alternatively, the computing system could evaluate ACR records for the content presentation device both before and after the time of the channel multi-match and could determine that there was a single matching channel with the same single channel both before the multi-match and after the multi-match. And based on this finding that of the same single-matching channel surrounded the time of the channel multi-match, the computing system could conclude that the single matching channel is the channel rendered by the content presentation device at the time of the detected multi-match.

Upon resolving the channel ambiguity through this process, the computing system could then take action, or cause action to be taken, based on the single determined channel. For instance, the computing system could record or report an identity of the single determined channel for use as audience-measurement data and/or could provide or use an identity of the single determined channel as a basis to invoke DAI or other channel-specific action.

Accordingly, disclosed is a method for determining a channel rendered by a content presentation device to facilitate taking a channel-specific action such as recording audience-measurement data and/or invoking dynamic content modification such as DAI. The method involves a computing system detecting a channel multi-match with non-matching programs. Further, the method involves the computing system responding to at least the detecting of the channel multi-match with non-matching programs by performing disambiguation based at least in part on detecting at least one of an earlier or later single-channel match as to a single known channel. And the method involves, based on the disambiguation, the computing system using the single known channel as a basis for carrying out at least one channel-specific operation.

Further disclosed is a computing system including a network communication interface, a processing unit, non-transitory data storage, and program instructions stored in (e.g., on) the non-transitory data storage and executable by the processing unit to carry out these and/or other disclosed operations. And disclosed is a computer-readable storage medium encoding, embodying, and/or otherwise storing program instructions executable by a processing unit to carry out such operations.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
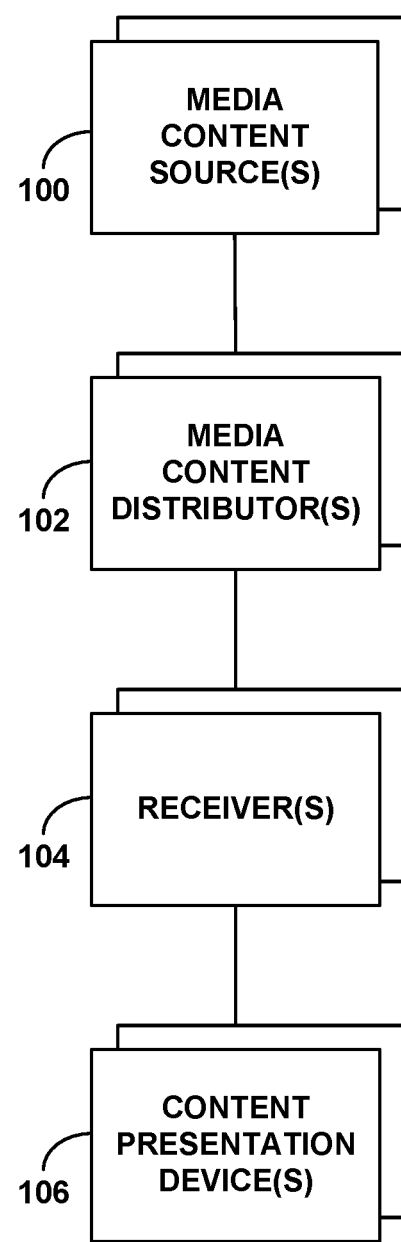
FIG. 1 is a simplified block diagram of an example system in which various disclosed principles can be implemented.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcast networks, such as ABC, NBC, CBS, FOX, HBO, and CNN, the media content distributors 102 could be local affiliates and/or other local content distributors of those networks in particular designated market areas (DMAs), and the receivers 104 and content presentation devices 106 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver 104 could then respond to user input or one or more other triggers by tuning to a selected channel and outputting to a content presentation device 106 the media content that is arriving on the selected channel. And the content presentation device 106 could receive and render the media content (e.g., display or otherwise present the content).

In this or other arrangements, as noted above, as the content presentation device receives and renders this media content, the content presentation device may have no indication of the channel on which the media content is arriving, e.g., of the channel to which the receiver is tuned. Rather, the content presentation device may be configured simply to receive the media content as a media stream from the receiver and to render the received media content. Per the present disclosure, however, the content presentation device may be in communication with a network server and may work with the network server to facilitate identification of the channel and thus to facilitate taking useful channel-specific action.

Figure 2:
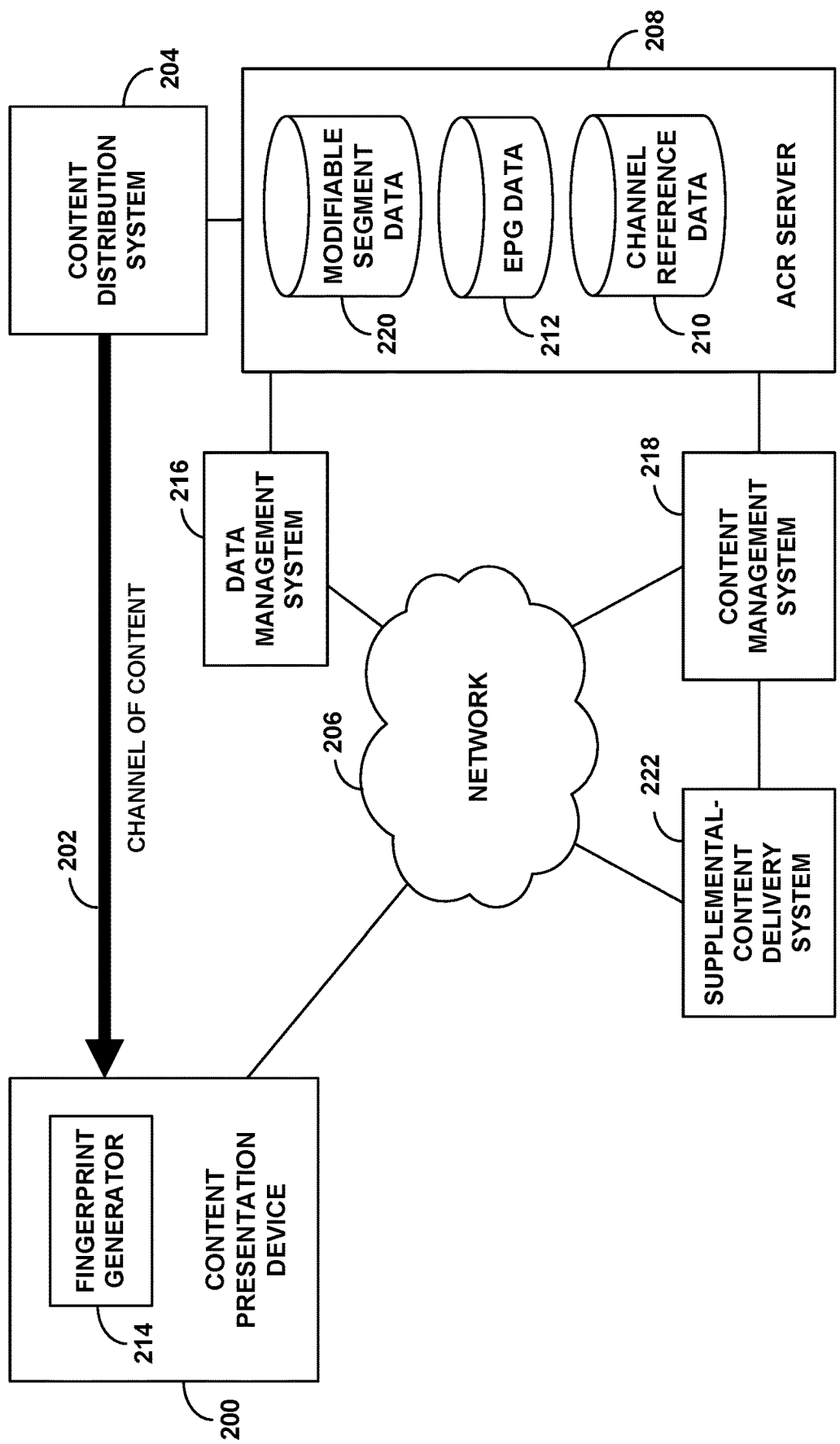
FIG. 2 is a simplified block diagram of an example network arrangement in which various disclosed principles can be implemented.

FIG. 2 illustrates more specifically an example system in connection with which the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise a representative media content source 100 and/or media content distributor 102 as shown in FIG. 1.

As such, the content presentation device 200 could be receiving and rendering the channel of content as a linear broadcast feed directly or indirectly from the content distributor system 204 through any of a variety of distribution channels, such as but not limited to cable, satellite, terrestrial over-the-air broadcast, broadband streaming, or others now known or later developed.

In an example implementation, the media content of the channel could define a sequence of digital frames of media content that the content presentation device is configured to render for presentation to a user. The content distributor system 204 might be broadcasting this sequence of frames encapsulated in a transport stream for receipt by a set top box, tuner, or other receiver that is tuned to the channel, and the receiver may be extracting the sequence of frames from the transport stream and outputting the sequence of frames for presentation by the content presentation device.

As further shown in FIG. 2, the content presentation device 200 is interconnected with a communication network 206, such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the channel of content 202 provided by the content distribution system 204.

Shown accessible via the network 206 (e.g., at a defined IP address on the network) is an ACR server 208, which could operate to engage in the fingerprint-based ACR processing noted above. With this network arrangement, the content presentation device 200 could engage in IP communication with the ACR server 208 via network 206, providing the ACR server 208 with query fingerprints representing the media content of the channel 202 that the content presentation device 200 is rendering. And the ACR server 208 could compare those query fingerprints with reference fingerprints of various known channels, in an effort to determine the channel 202 that the content presentation device 200 is rendering.

In line with the discussion above, the ACR server 208 could be provisioned with channel reference data 210 that includes reference fingerprints and associated channel-identification data respectively for each of various known channels.

In practice, for instance, the content distribution system 204 (e.g., one or more content providers) could generate and provide the reference fingerprints and associated channel-identification data to the ACR server on an ongoing basis respectively for each of various such channels. For instance, as to each channel of media content that the content distribution system outputs for delivery to content presentation devices, the content distribution system could generate timestamped digital reference fingerprints of the media content on a per frame basis or other ongoing basis, using any digital fingerprinting process now known or later developed, and could provide the ACR server with the timestamped digital reference fingerprints along with channel-identification data identifying the associated channel.

In a representative implementation, the channel-identification data provided per channel can characterize each channel by various attributes. For example, where a receiver or other such device provides multiple different channels selectable by channel number and/or channel name, the channel-identification data could characterize each channel by its respective channel number or name. Further, where each channel carries a particular content source's content, such as the content of one of a particular broadcast network for instance, the channel-identification data could character-ize each channel by its respective content source's identity. Still further, where more than one content distributor (e.g., multichannel distributor, affiliate, etc.) distribute a content source's content, channel-identification data could further characterize each channel by its respective content distributor's identity. In practice, the reference data could correlate each reference fingerprint with one or more of these and/or other attributes.

Further the digital fingerprinting process could take various forms. Without limitation, for instance, an example digital fingerprinting process for video could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

As the ACR server receives these reference fingerprints and associated channel-identification data, the ACR server 208 could store this information in a relational database or other form suitable for ready searching and access. Further, note that the ACR server 208 could alternatively generate some or all of this reference data itself and/or receive or otherwise have access to the reference data in another manner.

In addition, in a representative implementation, the ACR server 208 could also be provisioned with or otherwise have access to EPG data 212, specifying a scheduled program lineup respectively for each of various known channels. This EPG data could be keyed to channel-identification and could specify program timeslots and program-identification per timeslot on a per-channel basis. The ACR server 208 could likewise receive this EPG data from the content distribution system 204 or from one or more other sources and could store the EPG data for ready searching and access. Although the figure shows the EPG data 212 separate from the channel reference data 210, these two sets of data could alternatively be integrated together or provided in another manner.

In addition, as shown, the content presentation device 200 could be equipped with a fingerprint generator 214 (e.g., program instructions executable by a processor of the content presentation device 200), which could be configured to generate query fingerprints representing the media content of the channel 202 that the content presentation device 200 is rendering at any given time. The fingerprint generator 214 could be configured to receive as input a copy of the media content of the channel as the media content arrives at the content presentation device 200 and/or is processed for presentation by the content presentation device 200, and the fingerprint generator 214 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could be configured to transmit its generated query fingerprints via network 206 to the ACR server 208 for analysis, to facilitate fingerprint-based ACR and associated channel-specific action. By way of example, the content presentation device 200 could be configured to periodically or from time to time transmit to the server the query fingerprints representing a latest series of frames of the channel being rendered by the content presentation device 200. For instance, the content presentation device 200 could generate a message carrying the latest generated query fingerprints, along with one or more timestamps and/or other associated data, and could transmit the message to the IP of the ACR server 208 for analysis.

As noted above, given the query fingerprints representing media content of the channel 202 being rendered by the content presentation device 200, and given the reference data including reference fingerprints respectively representing each of various known channels, the ACR server 208 could engage in fingerprint-based ACR processing. In particular, as noted, the fingerprint-matching server could compare the query fingerprints with the reference fingerprints in an effort to find a match.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of just one specific channel, the ACR server 208 could then conclude that that is the channel being rendered by the content presentation device 200.

And as further noted above, based on this determined identification of the channel being rendered by the content presentation device, the ACR server 208 could then carry out, or cause to be carried out, one or more useful channel-specific actions.

By way of example, the ACR server 208 could responsively report to a data management system 216 that the content presentation device 200 is presenting the identified channel, as a record of media consumption that could help facilitate targeted advertising or other operations.

For instance, the ACR server 208 could generate and transmit to the data management system 216 an ACR data record that includes information such as the following, for addition to a set of audience-measurement data used as a basis for channel ratings:

(1) Timestamp—representing a date and time of the fingerprint match or of the associated content presentation, measured along a linear timeline with respect to the channel of content for instance. The ACR server 208 could determine this timestamp from a system clock and/or from one or more fingerprint timestamps.

(2) Device ID—a unique identifier of the content presentation device. The ACR 208 could receive this device ID from the content presentation device 200 together with the query fingerprint data or could otherwise determine this data.

(3) Channel ID—a unique identifier of the channel whose reference fingerprint data the ACR server 208 determined to match the query fingerprint data. The ACR server 208 could determine this information from the channel-identification data included in the reference data 210.

(4) Program ID—a unique identifier of the program that the EPG data 212 specifies was scheduled on the channel at the time of the fingerprint match. The ACR server 208 could determine this information by querying to the EPG data 212 based on channel identification and time information.

Further, as another example, the ACR server 208 could use the identified channel as a basis to invoke dynamic content modification, such as DAI.

To facilitate dynamic content modification in an example implementation, the ACR server 208 may have received in advance from a content management system 218 a set of modifiable content segment data 220 including fingerprints of each of various modifiable content segments (e.g., replaceable ads) and with associated metadata. Thus, having identified the channel being rendered by the content presentation device, the ACR server 208 could then responsively commence comparing the reference fingerprints of that identified channel with the fingerprints of the various modifiable content segments in an effort to find a match. And upon finding with sufficient certainty that the identified-channel reference fingerprints match the fingerprints of a specific modifiable content segment, the ACR server 208 could then engage in signaling to enable and cause the content presentation device 200 to carry out a content modification with respect to that modifiable content segment.

For instance, the ACR server 208 could provide the content presentation device 200 with various data regarding the upcoming modifiable content opportunity, including timing information and other content-modification information for example, to enable the content presentation device to obtain supplemental content. And the ACR server 208 could provide the content presentation device 200 with certain reference fingerprints of the identified channel for use by the content presentation device 200 to help confirm that the content presentation device 200 continues to receive the identified channel, as a condition for starting or continuing with the content modification.

The content presentation device 200 could then engage in signaling via network 206 with the content management system 218 and perhaps with a supplemental-content delivery system 222, to ascertain and obtain supplemental content (e.g., a replacement advertisement). And the content presentation device 200 could carry out the content modification with respect to the modifiable content segment.

As indicated above, a problem that can arise when the ACR server 208 carries out its fingerprint-based ACR content analysis is that the ACR server 208 may detect a multi-match scenario. Namely, the ACR server 28 may detect with sufficient confidence that the query fingerprint data provided by the content presentation device 200 matches reference fingerprint data respectively of each of multiple known channels. For instance, when the ACR server 208 compares with the reference fingerprint data a latest query fingerprint representing a frame of media content being rendered by the content presentation device, the ACR server 208 may determine with sufficient confidence that the query fingerprint matches reference fingerprints of multiple known channels.

Variations on this process of detecting this multi-match scenario are possible as well. For instance, if the ACR server 208 compares groups of fingerprints at a time, the ACR server 208 may determine with sufficient confidence that a latest set of query fingerprints representing frames of media content being rendered by the media presentation device matches sets of reference fingerprint data respectively representing media content of multiple known channels. Further, the ACR server 208 could compare various channels' reference fingerprint data with each other and could flag a set of channels as being a candidate multi-match group based on a finding that the channels' reference fingerprint data matches each other, and the ACR server 208 could then detect a multi-match scenario with respect to that group of channels by determining that the query fingerprint data from the content presentation device matches the reference fingerprint data of at least one of the channels in the group and determining that the group is flagged as a candidate multi-match group.

When the ACR server 208 detects a multi-match scenario, the ACR server 208 could responsively generate a multi-match log, and the ACR server 208 could likewise transmit the multi-match log to the data management system 216.

In a representative implementation, the ACR server 208 could include in this multi-match log various useful information that describes the multi-match scenario encountered by the ACR server 208. For example, the multi-match log could include data specifying at least the following information:

(1) Timestamp—representing a date and time of the multi-match or associated content presentation, measured along a linear timeline with respect to the channel of content for instance. As noted above, the ACR server 208 could determine this timestamp from a system clock and/or from one or more fingerprint timestamps.

(2) Device ID—a unique identifier of the content presentation device. As noted above, the ACR 208 could receive this device ID from the content presentation device 200 together with the query fingerprint data or could otherwise determine this data.

(3) Multiple Channel IDs—a list of identifiers of each of the channels in the multi-match group, i.e., each of the channels whose reference fingerprint data the ACR server 208 determined to match the query fingerprint data. The ACR server 208 could determine this information from the channel-identification data included in the reference data 210.

(4) Multiple Program IDs—for each channel of the multi-match group, an identification of the programs that the EPG data 212 specifies was scheduled on the channel at the time of the multi-match. The ACR server 208 could determine these program identifiers by querying to the EPG data 212 based on channel identification and time information.

In line with the discussion above, when the ACR server 208 generates this multi-match log, the ACR server 208 may detect a channel multi-match with non-matching programs. For instance, based on the ACR server's analysis of the EPG data for the channels that make up the multi-match group, the ACR server 208 could determine that at least two of the channels were scheduled at the time of the multi-match to be presenting different programs than each other. More particularly, the ACR server 208 might determine that at least a predefined threshold percentage of the identified programs (one per channel in the multi-match group) were different than each other. This predefined threshold percentage could be 100%, where all of the identified programs were different than each other, or could be a lower percentage that encompasses at least two of the identified programs.

Alternatively, the data management system 216 could detect based on the multi-match log a channel multi-match with non-matching programs. For instance, the data management system 216 could determine that the multi-match log lists multiple matching channels and specifies at least the predefined threshold percentage of different programs that were scheduled to be presented on the channels of the multi-match group.

In response to at least detecting this channel multi-match with non-matching programs (i.e., specifically in response to at least this combination of factors), the ACR server 208, the data management system 216, and/or one or more other entities defining a representative computing system could then carry out the presently disclosed disambiguation process in an effort to identify the channel that was being rendered by the content presentation device 200 at the time of the multi-match.

As noted above, the disambiguation process that is carried out in response to at least detecting the channel multi-match with non-matching programs could involve taking into consideration one or more single-channel matches preceding and/or following the time of the detected multi-match.

To facilitate this, the computing system could consult ACR data records for the content presentation device 200 in an effort to find a preceding single-channel match nearest in time detected multi-match and/or a succeeding single-channel match nearest in time to the detected multi-match. As to a preceding match, the computing system could evaluate the timestamps of ACR data records established for the content presentation device 200 to find the single-match ACR data record that most recently preceded the multi-match log at issue. And as to a succeeding match, the computing system could evaluate the timestamps of the ACR data records established for the content presentation device 200 to find the first single-match ACR data record after the multi-match log at issue.

In example implementation, the computing system might further condition its use of each such preceding or succeeding single-match ACR data record on a determination that the timestamp of the ACR data record is threshold near enough in time to the time of the detected multi-match. For instance, the computing system might take into account a preceding or succeeding single-match ACR data record only if the difference between the timestamp of that ACR data record and the timestamp of the multi-match log is lower than a predefined threshold value set by engineering design to establish relevance. Considering the example scenarios discussed above where a channel multi-match with non-matching programs may occur, for instance, this threshold could be a typical or maximum length of a commercial break and/or a typical or maximum length of a program overrun, among other possibilities.

Further, in seeking to identify a single-channel match nearest in time to the detected multi-match for purposes of disambiguation, the computing system could require that a continuous time sequence of the same single channel matching. For instance, the computing system might take into account a preceding single-match ACR data record only if that ACR data record is the end of a continuous time sequence of single-match ACR data records specifying the same single channel match as each other. And the computing system might take into account a succeeding ACR data record only if that ACR data record is the start of a continuous time sequence of single-match ACR data records specifying the same single channel match as each other. Here, the computing system could require that there be at least a predefined threshold quantity of such single-match ACR data records in each such sequence, with the threshold being set by engineering design to establish relative certainty of the single match.

As noted above, the computing system could then operate to resolve the channel-identification ambiguity in any of various ways.

As one example, the computing system could use a single-channel match most recently preceding the detected multi-match as an indication of the channel that was likely being rendered by the content presentation device 200 at the time of the multi-match. Thus, the computing system could conclude that the channel being rendered by the content presentation device 200 at the time of the multi-match was the channel that the content presentation device 200 was determined to have been rendering at the time of that detected single-channel match. The theory here is that the content presentation device 200 was reasonably likely to have continued rendering present that particular channel during the time of the ACR multi-match.

As another example, the computing system could use a single-channel match that follows soonest after the detected multi-match as an indication of the channel that was likely being rendered by the content presentation device 200 at the time of the multi-match. Thus, the computing system could conclude that the channel being rendered by the content presentation device 200 at the time of the multi-match was the channel that the content presentation device 200 was determined to have been rendering at the time of that detected single-channel match. And the theory here is that the content presentation device 200 was reasonably likely to have been presenting that particular channel at the time of the ACR multi-match preceding the single match.

Still further, as another example, the computing system could use both preceding and succeeding single-channel matches to disambiguate the multi-match. For instance, the computing system could determine that a preceding single-channel match nearest in time to the detected multi-match and a succeeding single-channel match nearest in time to the detected multi-match both identify the same single channel as being rendered by the content presentation device 200, and thus that that single-channel matching effectively surrounds or sandwiches the detected multi-match. Based on this determination, the computing system could conclude that the channel being rendered by the content presentation device 200 at the time of the multi-match was the channel of those surrounding single-matches.

Once the computing system has thereby disambiguated the multi-match, the determined single matching channel could then be used as a basis to carry out a channel-specific action as discussed above.

For example, the computing system could record the determined single matching channel as a single-match ACR data record as noted above, for addition to a set of audience-measurement data used as a basis for channel ratings. Here, for instance, if the ACR server 208 carried out the disambiguation process, the ACR server 208 could then generate and provide the data management system 216 with the single-match ACR data record. Or if the data management system 216 carried out the disambiguation process, the data management system 216 could itself generate and record the single-match ACR data record.

And as another example, the computing system could use the determined single matching channel as a basis for carrying out dynamic content modification such as DAI. And here, for instance, if the data management system 216 carried out the disambiguation process, the data management system 216 could report the determined single matching channel to the ACR server 208, and the ACR server 208 could then invoke the dynamic content modification as described above. Whereas, if the ACR server 208 carried out the disambiguation process, the ACR server 208 proceed immediately with invoking the dynamic content modification process.

Other examples are possible as well.

Figure 3:
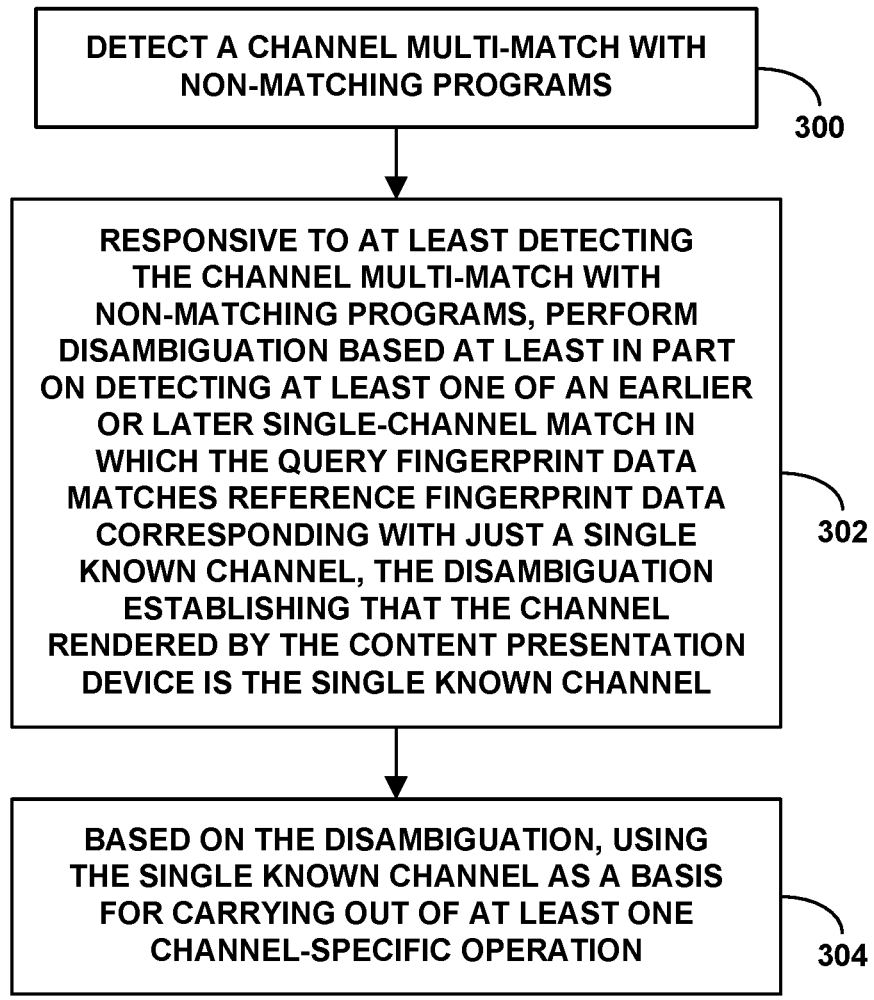
FIG. 3 is a flow chart depicting operations that can be carried out in accordance with the present disclosure.

FIG. 3 is next a flow chart depicting a method that can be carried out in line with the discussion above. One or more of the operations in the method depicted by FIG. 3 could be carried out by one or more entities, including, without limitation, ACR server 208 or data management system 216, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

As shown in FIG. 3, at block 300, the method includes detecting a channel multi-match with non-matching programs. At block 302, the method then includes, responsive to at least detecting the channel multi-match with non-matching programs, performing disambiguation based at least in part on detecting based at least in part on detecting at least one of an earlier or later single-channel match in which the query fingerprint data matches reference fingerprint data corresponding with just a single known channel, the disambiguation establishing that the channel rendered by the content presentation device is the single known channel. And at block 304, the method includes, based on the disambiguation, using the single known channel as a basis for carrying out of at least one channel-specific operation.

In line with the discussion above, such a computing system could receive from the content presentation device, via a network communication interface, the query fingerprint data representing the channel of content rendered (e.g., being rendered, having been rendered, or in queue to be rendered) by the media presentation device.

Further, as discussed above, the act detecting a channel multi-match with non-matching programs could include (i) detecting, based on digital-fingerprint comparison, a channel multi-match in which query fingerprint data representing a channel rendered by a content presentation device matches multiple instances of reference fingerprint data corresponding respectively with multiple known channels and (ii) detecting that, at a time of the detected channel multi-match, the multiple known channels were scheduled to be presenting different programs than each other.

Still further, as discussed above, the act of performing the disambiguation based at least in part on the detecting at least one of the earlier or later single-channel match could take various forms.

For instance, performing the disambiguation based at least in part on the detecting at least one of the earlier or later single-channel match could involve performing the disambiguation based at least in part on detecting both the earlier single-channel match and the later single-channel match and determining that both the earlier single-channel match and the later single-channel match identify as the single known channel the same channel as each other.

Alternatively, performing the disambiguation based at least in part on the detecting at least one of the earlier or later single-channel match could involve performing the disambiguation based at least in part on detecting the earlier single-channel match. Further, this could involve identifying as the earlier single-channel match a single-channel match that most recently precedes the time of the detected channel multi-match. And this could include identifying the single-match only if the single-channel match is threshold near in time to the time of the detected channel multi-match and/or only if the single-channel match ends a continuous time sequence of single-channel matches identifying the same single channel as each other.

Still alternatively, performing the disambiguation based at least in part on the detecting at least one of the earlier or later single-channel match could involve performing the disambiguation based at least in part on detecting the later single-channel match. Further, this could involve identifying as the later single-channel match a single-channel match that follows and is nearest in time to (i.e., follows soonest) the time of the detected channel multi-match. And this could include identifying the single-match only if the single-channel match is threshold near in time to the time of the detected channel multi-match and/or only if the single-channel match starts a continuous time sequence of single-channel matches identifying the same single channel as each other.

In addition, as discussed above, the at least one channel-specific operation that could be carried out based on the single known channel established through the disambiguation process could take various forms. For instance, the channel-specific operation could involve providing a record of the content presentation device rendering the single known channel, for use in channel ratings. Further or alternatively, the channel-specific operation could involve using an identity of the single known channel as a basis to invoke dynamic content modification, such as DAI, among other possibilities.

Note also that, in this method, the disambiguation process facilitates determining the channel rendered by the content presentation device, but this determination may or may not be correct in every instance. Still, the method could be carried out in an effort to facilitate channel identification and to facilitate taking associated channel-specific action.

Figure 4:
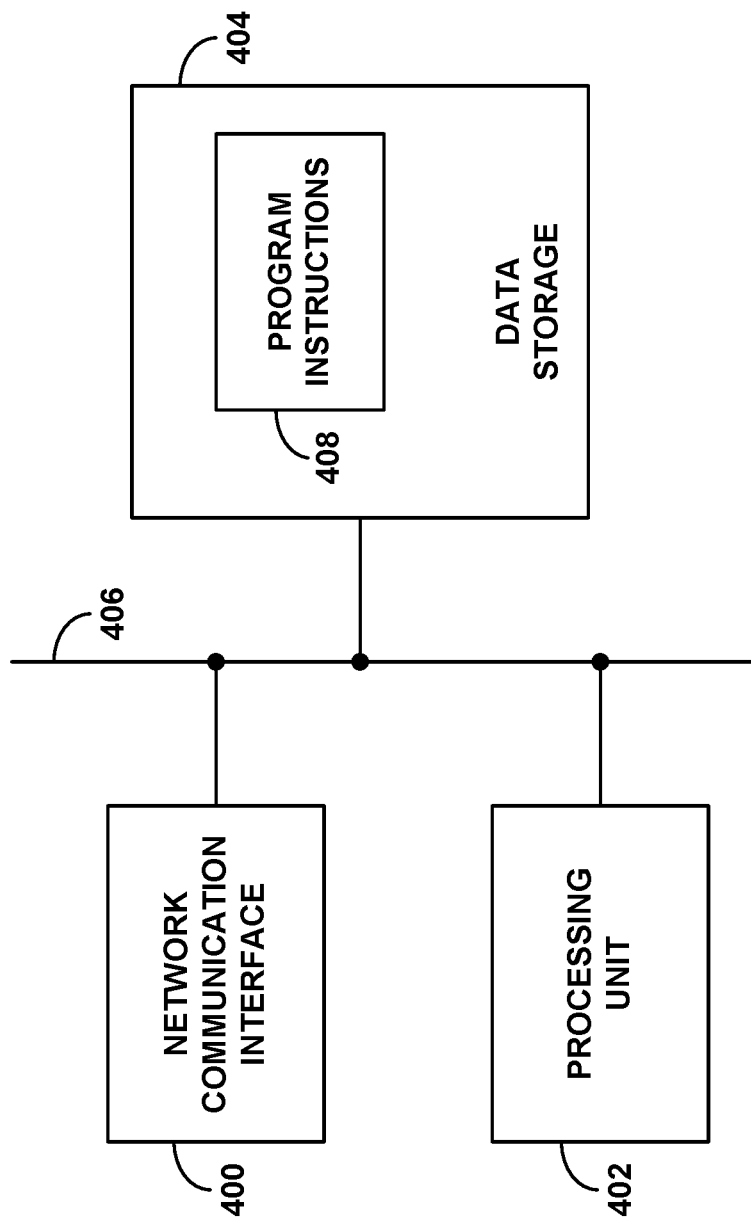
FIG. 4 is a simplified block diagram of an example computing system.

FIG. 4 is next a simplified block diagram of an example computing system operable in accordance with the present disclosure. This system could represent one or more network servers or other entities, such as ACR server 208, data management system 216, or others. As shown in FIG. 4, the example system includes at least one each of a network communication interface 400, a processing unit 402, and non-transitory data storage 404, any or all of which could be integrated together or, as shown, communicatively linked together by a system bus, network, or other connection mechanism 406.

Network communication interface 400 could comprise one or more physical network connection mechanisms to facilitate communication on a network such as network 206 discussed above, and/or for engaging in direct or networked communication with one or more other local or remote entities. As such, network communication interface 400 could comprise a wireless or wired Ethernet interface or other type of network interface, for engaging in IP communication and/or other type of network communication.

Processing unit 402 could comprise one or more general purpose processors (e.g., microprocessors) and/or one or more specialized processors (e.g., application specific integrated circuits). And non-transitory data storage unit 404 could comprise one or more volatile and/or non-volatile storage components, such as optical, magnetic, or flash storage.

As shown, the non-transitory data storage 404 then stores program instructions 408, which could be executable by any of the one or more processing units 402 to carry out various operations described herein, such as the operations depicted in FIG. 3 and described above for instance.

Various features described above could be applied in this context as well, and vice versa.

Figure 5:
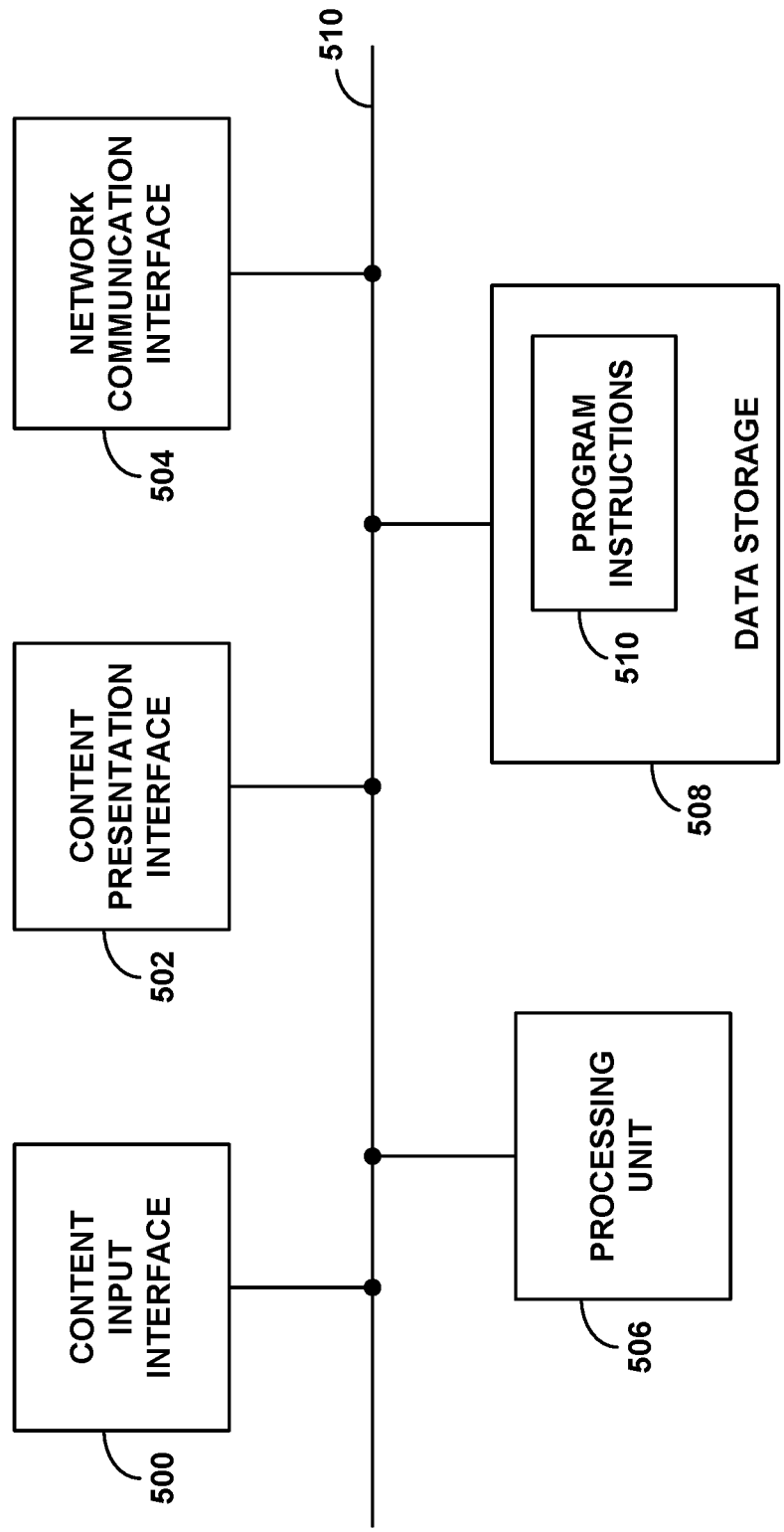
FIG. 5 is a simplified block diagram of an example content presentation device.

Finally, FIG. 5 is a simplified block diagram of an example content presentation device operable in accordance with the present disclosure. In line with the discussion above, this content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 5, the example content presentation device includes at least one each of a media input interface 500, a media presentation interface 502, a network communication interface 504, a processing unit 506, and non-transitory data storage 508, any or all of which could be integrated together or, as shown, communicatively linked together by a system bus, network, or other connection mechanism 510.

Media input interface 500 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 502 could comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 504 could comprise a physical network connection mechanism to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Further, processing unit 506 could then comprise one or more general purpose processors (e.g., microprocessors) and/or one or more specialized processors (e.g., application specific integrated circuits). And non-transitory data storage 508 could comprise one or more volatile and/or non-volatile storage components, such as optical, magnetic, or flash storage. Further, as shown, non-transitory data storage 508 stores program instructions 512, which could be executable by processing unit 506 to carry out various content-presentation-device operations described here.

Exemplary embodiments have been described above. Those skilled in the art will understand, however, that changes and modifications may be made to these embodiments without departing from the true scope and spirit of the invention.

What is claimed is:

1. A method comprising:
   detecting, by a computing system, a channel multi-match with non-matching programs, wherein detecting the channel multi-match with non-matching programs includes (i) detecting, based on digital-fingerprint comparison, the channel multi-match in which query fingerprint data representing a channel rendered by a content presentation device matches multiple instances of reference fingerprint data corresponding respectively with multiple known channels and (ii) detecting that, at a time of the detected channel multi-match, the multiple known channels were scheduled to be presenting different programs than each other;
   responsive to at least detecting the channel multi-match with non-matching programs, performing, by the computing system, disambiguation based at least in part on detecting at least one of an earlier or later single-channel match in which the query fingerprint data matches reference fingerprint data corresponding with just a single known channel, wherein the disambiguation establishes that the channel rendered by the content presentation device is the single known channel; and
   based on the disambiguation, using, by the computing system, the single known channel as a basis for carrying out of at least one channel-specific operation.

2. The method of claim 1, wherein performing the disambiguation based at least in part on the detecting at least one of the earlier or later single-channel match comprises performing the disambiguation based at least in part on detecting both the earlier single-channel match and the later single-channel match and determining that both the earlier single-channel match and the later single-channel match identify, as the single known channel, the same channel as each other.

3. The method of claim 1, wherein performing the disambiguation based at least in part on the detecting at least one of the earlier or later single-channel match comprises performing the disambiguation based at least in part on detecting the earlier single-channel match.

4. The method of claim 3, wherein performing the disambiguation based at least in part on detecting the earlier single-channel match comprises:
   identifying, as the earlier single-channel match, a single-channel match that most recently precedes the time of the detected channel multi-match.

5. The method of claim 4, wherein identifying the single-channel match that most recently precedes the time of the detected channel multi-match comprises identifying the single-channel match only if the single-channel match is threshold near in time to the time of the detected channel multi-match.

6. The method of claim 4, wherein identifying the single-channel match that most recently precedes the time of the detected channel multi-match comprises identifying the single-channel match only if the single-channel match ends a continuous time sequence of single-channel matches identifying the same single channel as each other.

7. The method of claim 1, wherein performing the disambiguation based at least in part on the detecting at least one of the earlier or later single-channel match comprises performing the disambiguation based at least in part on detecting the later single-channel match.

8. The method of claim 7, wherein performing the disambiguation based at least in part on detecting the later single-channel match comprises:
   identifying, as the later single-channel match, a single-channel match that follows and is nearest in time to the time of the detected channel multi-match.

9. The method of claim 8, wherein identifying the single-channel match that follows and is nearest in time to the time of the detected channel multi-match comprises identifying the single-channel match only if the single-channel match is threshold near in time to the time of the detected channel multi-match.

10. The method of claim 8, wherein identifying the single-channel match that follows and is nearest in time to the time of the detected channel multi-match comprises identifying the single-channel match only if the single-channel match starts a continuous time sequence of single-channel matches identifying the same single channel as each other.

11. The method of claim 1, wherein the at least one channel-specific operation comprises providing a record of the content presentation device rendering the single known channel, for use in channel ratings.

12. The method of claim 1, wherein the at least one channel-specific operation comprises using an identity of the single known channel as a basis to invoke dynamic content modification.

13. The method of claim 12, wherein the dynamic content modification comprises dynamic advertisement insertion.

14. A computing system comprising:
   at least one network communication interface;
   at least one processing unit;
   at least one non-transitory data storage; and
   program instructions stored in the at least one non-transitory data storage and executable by the at least one processing unit to carry out operations including:
      receiving from a content presentation device, via the at least one network communication interface, query fingerprint data representing a channel of content rendered by the media presentation device,
      detecting a channel multi-match with non-matching programs, wherein detecting the channel multi-match with non-matching programs includes (i) detecting, based on digital-fingerprint comparison, the channel multi-match in which the received query fingerprint data matches multiple instances of reference fingerprint data corresponding respectively with multiple known channels and (ii) detecting that, at a time of the detected channel multi-match, the multiple known channels were scheduled to be presenting different programs than each other,
      responsive to at least detecting the channel multi-match with non-matching programs, performing disambiguation based at least in part on detecting at least one of an earlier or later single-channel match in which the query fingerprint data matches reference fingerprint data corresponding with just a single known channel, wherein the disambiguation establishes that the channel rendered by the content presentation device is the single known channel, and
      based on the disambiguation, using the single known channel as a basis for carrying out of at least one channel-specific operation.

15. The computing system of claim 14, wherein performing the disambiguation based at least in part on the detecting at least one of the earlier or later single-channel match comprises performing the disambiguation based at least in part on detecting both the earlier single-channel match and the later single-channel match and determining that both the earlier single-channel match and the later single-channel match identify, as the single known channel, the same channel as each other.

16. The computing system of claim 14, wherein performing the disambiguation based at least in part on the detecting at least one of the earlier or later single-channel match comprises performing the disambiguation based at least in part on detecting the earlier single-channel match.

17. The computing system of claim 14, wherein performing the disambiguation based at least in part on the detecting at least one of the earlier or later single-channel match comprises performing the disambiguation based at least in part on detecting the later single-channel match.

18. The computing system of claim 14, wherein the at least one channel-specific operation comprises providing a record of the content presentation device rendering the single known channel, for use in channel ratings.

19. The computing system of claim 14, wherein the at least one channel-specific operation comprises using an identity of the single known channel as a basis to invoke dynamic content modification.

20. A non-transitory computer-readable medium having stored thereon instructions executable by a processing unit to carry out operations including:

detecting a channel multi-match with non-matching programs, wherein detecting the channel multi-match with non-matching programs includes (i) detecting, based on digital-fingerprint comparison, the channel multi-match in which query fingerprint data representing a channel rendered by a content presentation device matches multiple instances of reference fingerprint data corresponding respectively with multiple known channels and (ii) detecting that, at a time of the detected channel multi-match, the multiple known channels were scheduled to be presenting different programs than each other, responsive to at least detecting the channel multi-match with non-matching programs, performing disambiguation based at least in part on detecting at least one of an earlier or later single-channel match in which the query fingerprint data matches reference fingerprint data corresponding with just a single known channel, wherein the disambiguation establishes that the channel rendered by the content presentation device is the single known channel, and based on the disambiguation, using the single known channel as a basis for carrying out of at least one channel-specific operation.

* * * * *